(12) United States Patent
Sloan

(10) Patent No.: US 9,458,335 B1
(45) Date of Patent: Oct. 4, 2016

(54) INK SYSTEM FOR CURE UNDER LOW-ENERGY CONDITIONS

(71) Applicant: Donald D. Sloan, Trustee of the Donald D. Sloan Trust, and His Successor and Successors, Platte City, MO (US)

(72) Inventor: Donald D. Sloan, Platte City, MO (US)

(73) Assignee: Donald D. Sloan, Platte City, MO (US), Trustee of the Donal D. Sloan Trust ( * ) Notice: Subject to any disclaimer, the term of this patent is extended or adjusted under 35 U.S.C. 154(b) by 0 days.

(21) Appl. No.: 14/790,984

(22) Filed: Jul. 2, 2015

(51) Int. Cl.
| | |
|---|---|
| *C09D 11/107* | (2014.01) |
| *C08K 3/36* | (2006.01) |
| *C09D 11/101* | (2014.01) |
| *C09D 11/104* | (2014.01) |
| *C09D 11/037* | (2014.01) |
| *C09D 11/10* | (2014.01) |

(52) U.S. Cl.
CPC ............. *C09D 11/107* (2013.01); *C08K 3/36* (2013.01); *C09D 11/037* (2013.01); *C09D 11/10* (2013.01); *C09D 11/101* (2013.01); *C09D 11/104* (2013.01)

(58) Field of Classification Search
None
See application file for complete search history.

(56) References Cited

U.S. PATENT DOCUMENTS

| | | | |
|---|---|---|---|
| 2004/0132862 A1* | 7/2004 | Woudenberg | C09D 11/34 523/160 |
| 2007/0017415 A1* | 1/2007 | Oyanagi | C09D 11/101 106/31.65 |
| 2012/0007912 A1* | 1/2012 | Kagose | B41J 11/002 347/20 |

FOREIGN PATENT DOCUMENTS

CN 102532967 A * 7/2012 ............. C09D 4/006

OTHER PUBLICATIONS

Yuan, Weixiong (CN 102532967 A—Machine Translation), Rapid curing coating applicable to UV-LED (Ultraviolet-Light-Emitting Diode) light source and preparation source thereof, Jul. 4, 2012, pp. 3-4.*

* cited by examiner

*Primary Examiner* — Lisa M Solomon
(74) *Attorney, Agent, or Firm* — Hovey Williams LLP

(57) ABSTRACT

UV-curable ink formulations are provided that are capable of being cured under low-energy conditions, such as with a conventional mercury vapor lamp operating at half or less of the lamp's nominal wattage. Methods for forming a printed ink image on a substrate using the ink are also provided, which permit maintenance of relatively high line speeds while consuming less energy due to the use of lower-wattage lamp settings.

21 Claims, No Drawings

INK SYSTEM FOR CURE UNDER LOW-ENERGY CONDITIONS

BACKGROUND OF THE INVENTION

1. Field of the Invention

The present invention generally pertains to UV-curable ink formulations that are capable of being cured under low-energy conditions and methods for creating a printed ink image on a substrate using the ink. In particular, the ink formulations may be cured using conventional high-wattage bulbs operated at half or less of the bulb's nominal wattage.

2. Description of the Prior Art

Traditional UV-curable ink printing systems commonly utilize high-wattage bulbs (e.g., greater than 200 W) to deliver the necessary UV light energy to initiate the free-radical polymerization processes that result in curing of the ink onto the substrate to which it has been applied. The use of bulbs that emit these high energy levels has heretofore been critical to the prevention of oxygen inhibition during the cure process and to facilitate rapid cure times so that press throughput can be optimized. However, the use of high-wattage bulbs presents a number of concerns. As can be readily appreciated, the energy usage to operate equipment with high-wattage bulbs is quite high. Apart from the energy usage associated with the direct operation of the bulbs themselves, there are also indirect energy consequences as well. These bulbs also tend to emit relatively large amounts of heat energy when operated, which may need to be countered with more powerful climate control systems. In addition, the heat energy produced limits the ability of the printer to utilize heat-sensitive substrates, such as certain types of plastics and films that can warp under even fairly mild elevated temperature conditions.

With electrical power grids being taxed to their practical limits, municipalities and utilities often are forced to impose energy caps on businesses. In the case of a printer utilizing a large number of printing presses with high-wattage bulbs, these caps either mean that the printer may encounter limits in production and an inability to grow its business through the addition of more printing presses. Consequently, a need exists in the art for an ink system that is capable of curing under exposure to lower-energy conditions without sacrificing line speed.

SUMMARY OF THE INVENTION

The present invention overcomes the problems associated with the use of high-wattage curing equipment by providing UV-curable ink formulations, and methods of printing therewith, that require less energy to fully cure and permit existing equipment to be operated at lower energy levels.

According to one embodiment of the present invention there is provided a UV-curable ink composition comprising a monomer system, an oligomer system, an acrylate polymer resin, a pigment, and a initiator system. The monomer system comprises at least one monofunctional monomer and at least one multifunctional monomer. The oligomer system comprises at least one urethane acrylate oligomer and at least one mercapto modified polyester acrylate. The initiator system comprises at least one phosphine oxide photoinitiator, at least one ketone photoinitiator, at least one titanocene photoinitator and at least one amine co-initiator.

According to another embodiment of the present invention there is provided a method for forming an article having a printed ink image thereon. An ink image is printed onto a substrate using a UV-curable ink composition to form a printed substrate. The UV-curable ink composition comprises a monomer system comprising at least one monofunctional monomer and at least one multifunctional monomer, an oligomer system comprising at least one mercapto modified polyester acrylate, and an initiator system comprising one or more members selected from the group consisting of phosphine oxide photoinitiators, ketone photoinitiators, and titanocene photoinitators. The printed substrate is subsequently passed through a curing station at a rate of at least 50 linear feet per minute to form the article. The curing station comprises at least one lamp that has a rated wattage of at least 200 W. The lamp is operated at 50% or below of its rated wattage while the printed substrate is being passed through the curing station.

DETAILED DESCRIPTION OF THE PREFERRED EMBODIMENT

The present invention is generally directed toward UV-curable ink compositions that can be cured using traditional lamp technology, such as mercury vapor lamps, operating at a fraction of the lamp's rated (i.e., nominal) wattage. Embodiments of the present invention permit existing press equipment, equipped with high-wattage lamps, to be operated at much lower power levels thereby resulting in considerable direct and indirect energy savings for the press operator. This is accomplished through the use of an ink composition comprising unique monomer, oligomer, and initiator systems that rapidly and completely cure upon exposure to UV light at reduced energy and power levels.

In certain embodiments of the present invention, the monomer system comprises at least one monofunctional monomer, at least one multifunctional monomer, or at least one monofunctional monomer and at least one multifunctional monomer. In particular embodiments, the multifunctional monomer may be difunctional or trifunctional. In still further embodiments, the mono- and multifunctional monomers comprise acrylates or acrylic monomers. Exemplary acrylic monomers include dipropylene glycol diacrylate monomer (DPGDA), 1,6-hexanedioldiacrylate (HDODA), isobornyl acrylate (IBOA), 2-phenoxyethylacrylate (2-PEA), tripropylene glycol diacrylate (TPGDA), trimethylolpropane triacrylate (TMPTA), tetraethylene glycol diacrylate, and ethoxylated and propoxylated derivatives of the foregoing. The total monomer content of the ink formulation may be from about 20% to about 60% by weight, from about 25% to about 55% by weight, from about 30% to about 50% by weight, or from about 35% to about 45% by weight, based upon the total weight of the ink formulation. The monofunctional monomers may be present in the ink formulation at a level of between about 5% to about 35% by weight, between about 10% to about 30% by weight, or between about 15% to about 25% by weight. The total multifunctional monomer content of the ink may be from about 5% to about 35% by weight, between about 10% to about 30% by weight, or between about 15% to about 25% by weight. More particularly, when the at least one multifunctional monomer comprises a difunctional monomer, the difunctional monomer may be present within the ink composition at a level of from about 6% to about 35% by weight, from about 10% to about 28% by weight, or from about 14% to about 22% by weight. When the at least one multifunctional monomer comprises a trifunctional monomer, the trifunctional monomer may be present within the ink formulation at a level of from about 0.1 to about 10% by weight, from about 0.5 to about 7% by weight, or from about 1% to about 5% by weight.

In certain embodiments, the oligomer system comprises at least one of a urethane acrylate oligomer and a polyester acrylate oligomer. In particular embodiments, the oligomer system comprises both a urethane acrylate oligomer and a polyester acrylate oligomer. In certain embodiments, the urethane acrylate oligomer comprises two or more oligomers, at least one of which is a difunctional aliphatic urethane acrylate. Exemplary urethane acrylate oligomers include EBECRYL 8811 from Allnex and CN 983 from Sartomer. The urethane acrylate oligomer may also contain a polyether structure that assists in overcoming the problem of oxygen inhibition of the free-radical polymerization process. This contributes to faster curing of the ink composition at lower energy and power levels. In certain embodiments, the polyester acrylate oligomer is a mercapto modified polyester acrylate. An exemplary mercapto modified polyester acrylate is EBECRYL LED 02, from Allnex. In certain embodiments of the present invention, the oligomer system comprises from about 10% to about 40% by weight, from about 15% to about 35% by weight, or from about 20% to about 30% by weight of the ink composition. When present in certain embodiments, the total urethane acrylate oligomer comprises from about 5% to about 25% by weight, from about 7.5% to about 20%, or from about 10% to about 17% by weight of the ink composition. In certain embodiments, when present, the mercapto modified polyester acrylate is present within the ink composition at a level of from about 2.5% to about 20% by weight, from about 5% to about 15% by weight, or from about 7.5% to about 12.5% by weight of the ink composition.

In certain embodiments, the ink composition may comprise an acrylate polymer resin. In particular embodiments, the acrylic resin(s) may comprise methyl(meth) acrylates, ethyl(meth) acrylates, butyl(meth) acrylates, and copolymers thereof. The resins may exhibit glass transition temperatures (Tg) between the range of about −40° C. to about 80° C., between about −20° C. to about 60° C., or between about 0° C. to about 55° C. An exemplary acrylate polymer resin is ELVACITE 2016, a methyl methacrylate/n-butyl methacrylate copolymer from Lucite (MW=about 60,000 and Tg=59° C.). In certain embodiments, higher molecular weight resins are preferred. In those embodiments, the resins exhibit molecular weights of at least 10,000, at least 20,000, or at least 40,000. In other embodiments, the resins exhibit molecular weights of between about 7,000 to about 100,000, or between about 25,000 to about 85,000, or between about 40,000 to about 70,000 g/mol. In certain embodiments, the total acrylic polymer resin content of the ink formulations is from about 5% to about 25% by weight, from about 7.5% to about 20% by weight, or from about 10% to about 15% by weight of the ink composition.

Ink formulations may also include one or more pigments. In certain embodiments, the inks use pigments as the only colorant and do not contain any dyes. Pigment levels employed will vary somewhat depending upon the color of the ink. However, in particular embodiments, ink formulations according to the present invents comprise pigments at a level of between about 1% to about 25% by weight, between about 2% to about 20% by weight, or between about 3% to about 15% by weight. It is also within the scope of the present invention to provide unpigmented or clear coatings.

In certain embodiments, the photoinitiator system comprises one or more members selected from the group consisting of phosphine oxide photoinitiators, ketone photoinitiators, and titanocene photoinitiators. In preferred embodiments, the photoinitiator system comprises at least one of each of the aforementioned photoinitiator classes. It is also within the scope of the present invention for the photoinitiator system to further comprise an amine co-initiator. In certain embodiments, the photoinitiator system comprises a mixture of at least three, at least four, or at least 5 separate photoinitiators taken from the foregoing photoinitiator types. The photoinitiators are selected based upon their activity across certain targeted wavelength ranges at certain energy levels. In addition to being effective in adsorbing light in the UVA spectrum, the photoinitiator system utilized in the present invention has also been found to be quite reactive in the blue and green portion of the spectrum (between 450 to 570 nm) which greatly helps the broad band curing range of the ink. This broad band cure range allows for the scavenging of other, previously unused, portions of the light spectrum emitted from the curing lamps. Exemplary wavelengths over which the various photoinitiators are particularly active are from about 320 to about 450 nm, from about 360 to about 425 nm, or from about 380 to about 410 nm. In certain embodiments, the photointiators are particularly effective in adsorbing light in the UVA spectrum.

Photoinitiator selection also depends to some degree on the intended color of the ink formulation. If the ink formulation is to be white, then photoinitiators that have a tendency to cause yellowing of the ink should be avoided. However, if the ink is to be colored, yellowing is less of a concern and a broader variety of photoinitiators may be employed. In one embodiment, the photoinitiator system comprises one or more phosphine oxide photoinitiators, one or more ketone photoinitiators, one or more titanocene photointiators, and one or more amine-based photoinitators. In particular embodiments, the photoinitiator system comprises from about 2% to about 12% by weight, from about 4% to about 10% by weight, or between about 4.5% to about 7% by weight of the ink formulation.

Exemplary phosphine oxide photoinitiators include 2,4,6-trimethylbenzoyl-diphenyl-phosphine oxide (TPO photoinitiator) and bis(2,4,6-trimethylbenzoyl)-phenylphosphine oxide (available as IRGACURE 819 from BASF). The phosphine oxide photoinitiators may also be provided as liquids in the form of monomer dispersions and solutions. The phosphine oxide photoinitiator may be present in the ink composition at a level of from about 0.5% to about 5% by weight, from about 1% to about 3%, or from about 1.25% to about 2.25% by weight.

Exemplary ketone photoinitiators include 2-benzyl-2-dimethylamino-1-(4-morpholinophenyl)-butanone-1 (IRGACURE 369), 2-isopropylthioxanthone (ITX), 1-hydroxy-cyclohexyl-phenyl-ketone (IRGACURE 184), camphorquinone, 2-methyl-1[4-(methylthio)phenyl]-2-morpholinopropan-1-one (IRGACURE 907), 2,2-dimethoxy-1,2-diphenylethan-1-one (IRGACURE 651), benzophenone, 2,4-diethylthioxanthone (DETX), and benzildimethylketal (ESACURE 1). The ketone photoinitiator may be present in the ink composition at a level of from about 0.75% to about 7.5% by weight, from about 1.5% to about 6% by weight, or from about 2.5% to about 4.5% by weight. In certain embodiments, at least two ketone photoinitiators are used in the ink formulation.

An exemplary titanocene photoinitator includes bis(η-5-2,4-cylcopentadien-1-yl)-bis(2,6-difluoro-3-(1H-pyrrol-1-yl)-phenyl) titanium (IRGACURE 784). The titanocene photoinitiator may be present in the ink composition at a level of from about 0.01% to about 2.5% by weight, from about 0.1% to about 1.5% by weight, or from about 0.25% to about 1% by weight of the ink composition.

Exemplary amine-based photoinitiators include methyldiethanolamine (MDEA), amine acrylates (EBECRYL 7100), triethanolamine, copolymerizable amine (EBECRYL P115), acrylated amine (EBECRYL P104), and reactive amine co-initiators (CN 373). In certain embodiments, the ink composition comprises at least two amine-based photoinitiators. The amine-based photoinitiators may be present in the ink composition at a level of from about 0.5% to about 8% by weight, from about 1.5% to about 6.5% by weight, or from about 3% to about 5% by weight. In certain embodiments, higher amine values are preferred. Particularly amine values between about 90 to about 400, or between about 120 to about 350, or between about 150 to about 320 are preferred.

The ink formulations may include a number of other, optional components such a stabilizers, surfactants, fragrances, defoaming agents, suspension agents, and flow additives. These additional components are generally present in ink formulations at a level of less than 5% by weight each, less than 2.5% by weight each, or less than 1% by weight each. In certain embodiments, the ink compositions comprise fumed silica (e.g., AEROSIL 200) in an amount of from about 0.5% to about 6% by weight, from about 1% to about 5% by weight, or from about 2% to about 4% by weight of the ink composition. In certain embodiments, the ink formulations may further comprise an amide wax (e.g., CERAFLOUR 988 micronized amide wax) in an amount of from about 0.5% to about 6% by weight, from about 1% to about 5% by weight, or from about 2% to about 4% by weight of the ink composition.

The coating composition may also comprises one or more antimicrobial agents. Generally, any antimicrobial agent may be used with the coating compositions described herein. However, certain embodiments of the present invention utilize silver-based antimicrobial agents. Such silver-based antimicrobial agents may comprise metallic silver (i.e., zero valence atoms) or silver ions. Exemplary silver-based antimicrobial agents include Ionpure™, a soluble glass containing antimicrobial silver ions, available from Ishizuka Glass, Iwakura-shi, Japan, Biomaster™ from Addmaster (UK) Ltd., Agion from Agion Technologies, Wakefield, Mass., and BASF Iraguard B Silver. In certain embodiments, the antimicrobial agent is provided as a solid, particularly as a powder, that can be dissolved or suspended in the ink composition.

In those embodiments in which an antimicrobial agent is present, the coating exhibits germicidal properties. The germicidal properties of the coating composition make it particularly suited for use in applications where sanitary conditions are highly desirable such as in restaurants, hospitals, schools, and food and beverage processing facilities. In these applications, the coating composition may be applied to walls, food handling surfaces, and the like. Not only will surfaces having the coating applied thereto resist staining, but the surface itself is capable of killing microbes coming into contact therewith. The coating compositions are particularly suited for protecting surfaces from contamination with one or more, and in some embodiments all, of the following pathogens: *K. pneumoniae*, Methicillin Resistant *S. aureus* (MRSA), *Clostridium difficile, S. epidermidis, A. baumannii, C. albicans, E. coli, P. aeruginosa, S. aureus, Enterococcus* spp. (e.g., Vancomycin Resistant *Enterococcus faecalis* (VRE)), *Candida* spp., and CoNS. In particular embodiments, the coating compositions inhibit the growth of one or more, and preferably all, of the foregoing pathogens when tested according to AATCC Test Method 147. In still other embodiments, the coating composition is able to provide greater than a 3-log reduction in the levels of at least one, and preferably all, of the foregoing pathogens when tested according to Japanese Industrial Standard (JIS) Z 2801. In yet other embodiments, the coating composition is able to provide greater than a 4-log reduction, or even greater than a 5-log reduction, in one or more of the foregoing pathogens.

The viscosity of ink formulations according to the present invention depend to some degree on the type of printing press with which the ink will be used. If the ink is to be used with a roller coating press, the ink viscosity may be between about 200 to about 800 cps. If the ink is to be used with a flexographic printing press, the ink viscosity may be between about 200 to about 1000 cps. If the ink is to be used with a screen printing press, the ink viscosity may be between about 1000 cps to about 4000 cps. If the ink is to be used with a lithographic printing press, the ink will have a viscosity of greater than 4000 cps. All viscosities expressed herein are measured at 25° C. using a Brookfield viscometer.

The present invention also provides methods for printing an ink image onto a substrate. As noted above, the printing press utilized can be any type of printing press including a screen-printing press, or a flexographic printing press. The ink utilized with the printing press may be any UV-curable ink as described herein and is specifically formulated for a particular type of printing press.

Likewise, the substrate upon which the ink is applied may comprise any number of materials, including synthetic resin materials, glass, ceramic, metal, paper, and other natural and synthetic fibrous materials. Exemplary materials that can be used as substrates include polypropylene, polyethylene, polyethylene terephthalate, styrene, vinyl, polycarbonate, acrylic, cardboard, and TYVEK. The substrate may comprise sheets, webs or other thin films. In alternate embodiments, the substrate can be in the form of a finished product such as a container, and particularly a bottle. Because the light source operates in a reduced-power mode, significantly less heat is generated thereby enabling the substrate to comprise heat sensitive materials such as flexographic thin films, polyolefin films, and bioxy-oriented polypropylene (BOPP) films, which heretofore would have been damaged by the lamps operating at their full power setting.

In certain embodiments, the present invention is directed toward printing images on bottles, especially bottles made from synthetic resin material such as polyethylene, polypropylene, and PET. In some embodiments, bottle formation and printing occurs in immediate succession. In those embodiments, the bottle is blow molded from a blank, flame treated and imprinted with the ink image. In particular embodiments, the flame treatment and printing occur in very close proximity with both operations occurring within one and one-half revolutions of the bottle.

Once the ink has been deposited onto the substrate, the substrate is passed through a curing station having at least one lamp capable of emitting UV light in the 280-310 nm wavelength range and directing that UV light toward the substrate containing the printed ink image. In certain embodiments, the lamp is a mercury vapor lamp, but other types of lamps may be used such as a microwave-powered, electrodeless fusion lamp. The curing station may further comprise a reflector that helps to focus light emitted by the lamp onto the substrate.

In certain embodiments, the lamp has a nominal or rated wattage of at least 200 W, and preferably from about 200 W to about 300 W. The curing station may also feature a standby mode, which is a reduced power setting maintains lamp readiness for full illumination. In certain embodiments, the standby mode operates the lamp at 50% or less of its rated power. In other embodiments, the curing station may offer continuously adjustable power from 25% to 100%. In embodiments of the present invention, the lamp, having a rated wattage of at least 200 W, is operated at 50% or below, at 40% or below, or at 25% or below of its rated wattage while the printed substrate is passed through the curing station. Beneath the lamps is a conveyor system, such as a belt conveyor system, upon which the substrate bearing the printed ink image may be placed. The conveyor system carries the substrate past the curing station's lamp(s) at a preselected rate. In certain embodiments, the conveyor may operate at a speed of at least 50 linear feet per minute, at least 75 linear feet per minute, at least 100 linear feet per minute, or at least 125 linear feet per minute. In particular embodiments, the conveyor operates at a speed of from about 50 to about 250 ft/min, from about 100 to about 200 ft/min, or from about 125 to about 175 ft/min.

The selection of lamp power and conveyor speed, among other factors, directly affects the amount of radiant energy and radiant power that impinges upon the substrate during its passage through the curing station. In certain embodiments, the step of passing the printed substrate through the curing station exposes the ink composition printed thereon to a radiant energy level of from about 30 to about 125 mJ, or from about 50 to about 100 mJ, or from about 65 to about 85 mJ. In certain embodiments, the step of passing the printed substrate through the curing station exposes the ink composition printed thereon to a radiant power level of from about 400 to about 800 mW, from about 450 to about 750 mW, or from about 500 to about 700 mW. The ink image printed on the substrate emerges from the curing station fully cured.

In certain embodiments, ink compositions according to the present invention have excellent adhesion characteristics as determined by ASTM D3359-08 Standard Test Methods for Measuring Adhesion by Tape Test. Generally, this test method involves applying a layer of the ink to a particular substrate creating a lattice pattern of cuts in the cured ink, applying a pressure-sensitive tape over the lattice, and removing the lattice. Performance is then judged by how much, if any, of the ink was removed from the lattice by the tape. In particular embodiments according to the present invention, less than 5% of the ink is removed by the tape, and more preferably, none of the ink is removed by the tape. In this particular test, the ink is deposited on the substrate to form a film of at least 0.5 mil thickness. The substrate used in the adhesion test may vary from rigid plastic substrates like polyethylene, polycarbonate, corrugated polyethylene, PET, HDPE, flexible vinyl films such as those used for vehicle wraps, and metallic substrates. It is noted that for the purposes of the physical performance tests described herein (e.g., various adhesion and resistance tests), a pigment, dye or other colorant may be added to the coating composition to aid visual inspect of the coating's performance.

In certain embodiments of the present invention, the ink compositions also exhibit excellent resistance to a variety of aggressive solvents and chemicals such as acetone, paint thinners, alcohols, and acids. Specifically, the ink composition can be tested in accordance with ASTM D5402, incorporated by reference herein, and withstand at least 10, or even at least 50, rubs with a cloth or wad of cotton soaked with acetone, ethyl alcohol, or isopropyl alcohol without showing visible signs of the ink being removed from the substrate.

Adhesion to a variety of substrates is also evidenced in that substrates, and particularly bottles made of HDPE and PET, printed with ink compositions as described herein exhibit excellent washing characteristics. In certain embodiments, substrates bearing a printed image can withstand at least 100 washing cycles without visible image wear or degradation. As certain bottles are intended for use as containers for soaps and shampoos, it is very important that the printed image not be degraded upon exposure to the various surfactants and caustic materials present in those products.

Synthetic resin material bottles, such as HDPE and PET bottles, are often squeezed in order to deliver product from the bottle. In this respect, it is another important feature that the image printed thereon be capable of flexing with the bottle without visible signs of cracking or flaking off the bottle. In one such flex test, HDPE or PET bottles are immersed in water for 10 minutes. The bottle is flexed back and forth, simulating squeezing of product form the bottle, six times. The bottle is then visually inspected for signs of image degradation. In preferred embodiments, the bottles should exhibit no visible signs of image degradation, such as ink cracking or flaking from the bottle.

EXAMPLE

The following Example sets forth exemplary magenta and yellow screen printing ink compositions made in accordance with the present invention. Both inks are made employing a base varnish formulation, which is described in Table 1. The varnish is then mixed with the other components to form the finished ink composition. The exemplary ink formulations are described in Table 2.

TABLE 1

| Varnish Formulation | Wt. % |
| --- | --- |
| Trimethylolpropane triacrylate (TMPTA) (Sartomer) | 5 |
| 1,6 Hexanediol diacrylate (HDODA) (Sartomer) | 31.4 |
| 2-Phenoxyethyl acrylate (Sartomer) | 33 |
| MEHQ, stabilizer, (FIRST-CURE ST-1) (Archway) | 1.3 |
| Fragrance (Agilex) | 0.3 |
| ELVACITE 2016, methyl methacrylate/n-butyl methacrylate copolymer (Elvacite 2016)(Lucite) | 29 |

TABLE 2

| Component | Magenta Wt. % | Yellow Wt. % |
| --- | --- | --- |
| Varnish | 43.8 | 44.15 |
| 1,6 Hexanediol diacrylate (HDODA) (Sartomer) | 5 | 5 |
| Red pigment (Clariant) | 2 | — |
| Red pigment (BASF) | 2.2 | — |
| Hanza brilliant yellow pigment | — | 0.75 |
| Permanent yellow GG pigment (Clariant) | — | 1.95 |
| 3G/FGL yellow pigment | — | 2.25 |
| AEROSIL 200, fumed silica (Brenntag) | 3 | 2.35 |
| CN 983, urethane acrylate oligomer (Sartomer) | 5 | 5 |
| 2-Phenoxyethyl acrylate (Sartomer) | 5 | 5 |
| FOAMEX N, defoamer (Tego) | 0.7 | 0.7 |
| CRU FLUID 350, polydimethylsiloxane antifoam silicone fluid (Crucible) | 0.6 | 0.6 |
| Methyl diethanolamine (MDEA) (Brenntag) | 0.2 | 0.2 |
| CN 373, reactive amine co-initiator (Sartomer) | 4 | 4 |

TABLE 2-continued

| Component | Magenta Wt. % | Yellow Wt. % |
|---|---|---|
| 2-isopropylthioxanthone (ITX), photoinitiator (Biddle) | 3 | 3 |
| Bis(2,4,6-trimethylbenzoyl)-phenylphosphineoxide (IRGACURE 819), photoinitiator (BASF) | 1.5 | 1.5 |
| 2-Benzyl-2-dimethylamino-1-(4-morpholinophenyl)-butanone-1 (IRGACURE 369), photoinitiator (BASF) | 0.5 | 0.5 |
| Difunctional aliphatic urethane acrylate (EBECRYL 8811), oligomer (Allnex) | 10 | 10 |
| Bis($\eta$-5-2,4-cylcopentadien-1-yl)-bis(2,6-difluoro-3-(1H-pyrrol-1-yl)-phenyl) titanium (IRGACURE 784), photoinitiator (BASF) | 0.5 | 0.05 |
| Mercapto modified polyester acrylate resin (EBECRYL LED 02) (Allnex) | 10 | 10 |
| Micronized amide wax (CERAFLOUR 988) (BYK Chemie) | 3 | 3 |

The ink formulations were tested for curing characteristics upon exposure to a 200 W SPE UV mercury vapor lamp operating at 50% intensity (i.e., 100 W power setting). Leneta test cards bearing a sample screen-printed image were prepared and passed under the lamp at a linear speed of 50 feet per minute and 119 feet per minute. A photometer was used to measure the energy and power to which the test cards were exposed during each pass. At a rate of 50 ft/min, the test cards were exposed to 185 mJ and 586 mW. At a rate of 119 ft/min, the test cards were exposed to 75 mJ and 441 mW. In both cases, the ink image was fully cured following passage underneath the mercury vapor lamp.

The ink formulations were also tested for curing characteristics upon exposure to a 300 WPI Fusion UV lamp operating at 50% intensity. Leneta test cards bearing a smaple screen-printed image were prepared and passed under the lamp at a linear speed of 130 ft/min and 220 ft/min. A photometer was used to measure the energy and power to which the test cards were exposed during each pass. At a rate of 130 ft/min, the test cards were exposed to 70 mJ and 859 mW. At a rate of 220 ft/min, the test cards were exposed to 38 mJ and 481 mW. In both cases, the ink image was fully cured following passage underneath the Fusion lamp.

I claim:

1. A UV-curable ink composition comprising:
   a monomer system comprising at least one monofunctional monomer and at least one multifunctional monomer;
   an oligomer system comprising at least one urethane acrylate oligomer and at least one mercapto modified polyester acrylate;
   an acrylate polymer resin;
   a pigment; and
   an initiator system comprising at least one phosphine oxide photoinitiator, at least one ketone photoinitiator, at least one titanocene photoinitator and at least one amine co-initiator,
   wherein said UV-curable ink composition is capable of being cured by exposure to UV light emitted from a lamp operating at 100 W or less at a line speed of at least 50 ft/min.

2. The UV-curable ink composition of claim 1, said UV-curable ink composition further comprising fumed silica.

3. The UV-curable ink composition of claim 1, said UV-curable ink composition further comprising methyl diethanolamine (MDEA).

4. The UV-curable ink composition of claim 1, wherein said monomer system is comprised of mono-, di-, and trifunctional acrylate monomers.

5. The UV-curable ink composition of claim 1, wherein acrylate polymer resin is a methyl methacrylate/n-butyl methacrylate copolymer resin.

6. The UV-curable ink composition of claim 1, wherein said monomer system comprises from about 20% to about 60% by weight of said UV-curable ink composition.

7. The UV-curable ink composition of claim 1, wherein said oligomer system comprises from about 10% to about 40% by weight of said UV-curable ink composition.

8. The UV-curable ink composition of claim 1, wherein said initiator system comprises from about 2% to about 12% by weight of said UV-curable ink composition.

9. The UV-curable ink composition of claim 1, said UV-curable ink composition comprising an amide wax.

10. A method for creating an article having a printed ink image thereon comprising the steps of:
    printing an ink image onto a substrate using a UV-curable ink composition to form a printed substrate, said UV-curable ink composition comprising—
      a monomer system comprising at least one monofunctional monomer and at least one multifunctional monomer;
      an oligomer system comprising at least one mercapto modified polyester acrylate;
      and an initiator system comprising one or more members selected from the group consisting of phosphine oxide photoinitiators, ketone photoinitiators, and titanocene photoinitators;
    passing said printed substrate through a curing station at a rate of at least 50 linear feet per minute to form said article, said curing station comprising at least one lamp that has a rated wattage of at least 200 W, said lamp being operated at 50% or below of its rated wattage while said printed substrate is being passed through said curing station.

11. The method of claim 10, wherein said monomer system is comprised of mono-, di-, and trifunctional acrylate monomers.

12. The method of claim 10, wherein said monomer system comprises from about 20% to about 60% by weight of said UV-curable ink composition.

13. The method of claim 10, wherein said oligomer system further comprises at least one urethane acrylate oligomer.

14. The method of claim 10, wherein oligomer system comprises between about 10% to about 40% by weight of said UV-curable ink composition.

15. The method of claim 10, wherein said initiator system comprises between about 2% to about 12% by weight of said UV-curable ink composition.

16. The method of claim 10, wherein said lamp comprises a mercury-vapor lamp.

17. The method of claim 10, wherein said step of passing said printed substrate through a curing station exposes said ink composition to an energy level of from about 30 to about 125 mJ.

18. The method of claim 10, wherein said step of passing said printed substrate through a curing station exposes said ink composition to a power level of from about 400 to about 800 mW.

19. A UV-curable ink composition comprising:
a monomer system comprising at least one monofunctional monomer and at least one multifunctional monomer;
an oligomer system comprising at least one urethane acrylate oligomer and at least one mercapto modified polyester acrylate;
an acrylate polymer resin;
a pigment;
an initiator system comprising at least one phosphine oxide photoinitiator, at least one ketone photoinitiator, at least one titanocene photoinitiator and at least one amine co-initiator; and
fumed silica.

20. A UV-curable ink composition comprising:
a monomer system comprising at least one monofunctional monomer and at least one multifunctional monomer;
an oligomer system comprising at least one urethane acrylate oligomer and at least one mercapto modified polyester acrylate;
an acrylate polymer resin;
a pigment;
an initiator system comprising at least one phosphine oxide photoinitiator, at least one ketone photoinitiator, at least one titanocene photoinitator and at least one amine co-initiator; and
methyl diethanolamine (MDEA).

21. A UV-curable ink composition comprising:
a monomer system comprising at least one monofunctional monomer and at least one multifunctional monomer;
an oligomer system comprising at least one urethane acrylate oligomer and at least one mercapto modified polyester acrylate;
a methyl methacrylate/n-butyl methacrylate copolymer resin;
a pigment; and
an initiator system comprising at least one phosphine oxide photoinitiator, at least one ketone photoinitiator, at least one titanocene photoinitator and at least one amine co-initiator.

* * * * *